United States Patent [19]

Asano et al.

[11] Patent Number: 4,799,073
[45] Date of Patent: Jan. 17, 1989

[54] LENS SHIFTING MECHANISM

[75] Inventors: Seiji Asano; Yasuhiko Tanaka, both of Saitama, Japan

[73] Assignee: Fuji Photo Film Co., Ltd., Kanagawa, Japan

[21] Appl. No.: 133,727

[22] Filed: Dec. 15, 1987

[30] Foreign Application Priority Data

Dec. 15, 1986 [JP] Japan .................................. 61-298020
Dec. 15, 1986 [JP] Japan .................................. 61-298021

[51] Int. Cl.⁴ .......................... G03B 3/00; G02B 15/00
[52] U.S. Cl. ................................. 354/195.12; 350/429
[58] Field of Search ......................... 354/195.12, 195.1; 350/255, 425, 427, 429

[56] References Cited

U.S. PATENT DOCUMENTS

| | | | |
|---|---|---|---|
| 1,883,673 | 10/1932 | Fouquet | 350/429 |
| 1,922,537 | 8/1933 | Fouquet | 350/429 |
| 4,636,042 | 1/1987 | Komine et al. | 350/429 |

Primary Examiner—A. A. Mathews
Attorney, Agent, or Firm—Young & Thompson

[57] ABSTRACT

A photographic camera with a zoom lens comprises a fixed lens barrel and a movable lens barrel which has a fixed lens group and a movable unit movably receiving a lens group. The movable unit is adapted to rotate in the movable lens barrel so as to shift axially the movable lens group with respect to the fixed lens group when the movable lens barrel is axially moved in order to shift the zoom lens between a wide-angle and a telephotographic condition. The lenses of the lens group of the movable unit are held by lens holders that are a round-ended configuration with straight sides between the rounded ends. These straight sides leave part-circular spaces in the movable unit, which is in the form of a rotatable cylinder. Rods on which these lens holders are slidably mounted are disposed in these part-circular spaces, to achieve a compact configuration.

10 Claims, 2 Drawing Sheets

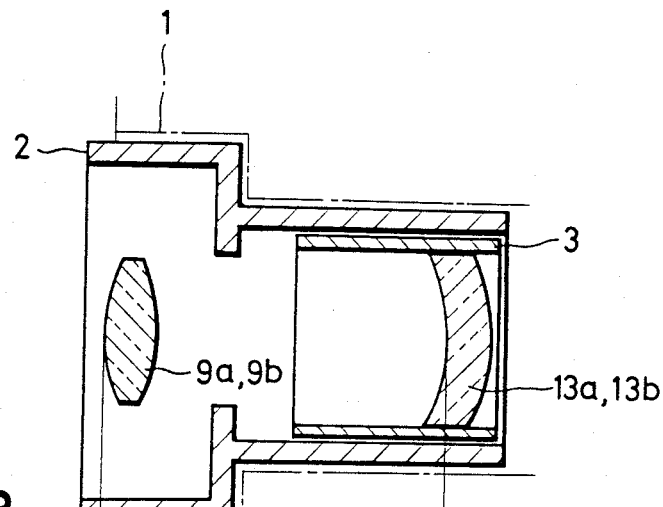
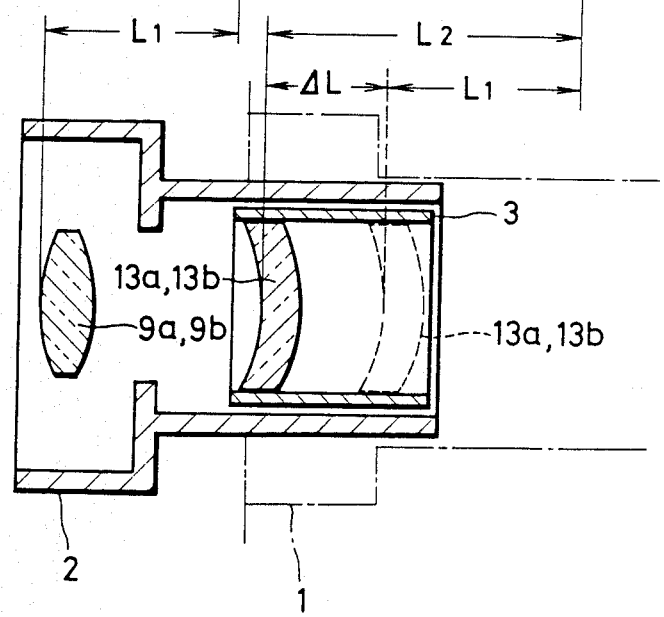

LENS SHIFTING MECHANISM

BACKGROUND OF THE INVENTION

The present invention relates to a lens shifting mechanism, and more particularly, but not exclusively, to a lens shifting mechanism suitable for being incorporated in a compact camera equipped with a small size zoom lens.

As is well known, compact cameras have a taking lens barrel formed together with the camera body and a lens systems with its associated elements incorporated partly in the lens barrel and partly inside the camera body. Due to such a construction of compact cameras, the overall length of the taking lens barrel is required to be as short as possible. On the other hand, there are many interchangeable lenses, for example zoom lenses, for use with single lens reflex cameras which have improved lens shifting mechanisms for zooming. One disadvantage of the conventional lens shifting mechanism is that at least two rotatable lens barrels with cam slots are needed to move two lens groups independently by different distances and, therefore, the overall axial length of the taking lens barrel becomes great and the barrels are large in diameter. For this reason, it is hard to equip compact cameras with the lens shifting mechanisms of the conventional interchangeable zoom lenses because then the overall size of the compact camera becomes large.

OBJECT OF THE INVENTION

It is, therefore, an object of the present invention to provide a lens shifting mechanism which enables, in particular, a zoom lens to be compact.

SUMMARY OF THE INVENTION

For accomplishing the above object, the present invention provides a lens shifting mechanism of a compact camera which comprises an outer lens barrel fixed to the body of the camera, an inner lens barrel which is supported by the outer lens barrel for axial movement and which holds therein fixedly a front lens group and movably a rear lens group, and shifting means disposed in the inner lens barrel which is adapted to cause the rear lens group to move axially relative to the front lens group when the inner lens barrel moves axially, thereby causing a relative movement between the front and rear lens groups when the inner lens barrel moves axially. The shifting means has a cylindrical cam barrel with cam slots engaged by pins on lens holders that hold the lens elements of the rear lens group, and a pin engaging a cam slot formed in the fixed lens barrel. Guide members movably support the lens holders for axial movement. The inner lens barrel is axially moved to shift the front and rear lens group together, thereby rotating the cylindrical cam barrel to shift the rear lens group relative to the front lens group.

According to a feature of a preferred embodiment of the present invention, the lens holder has the shape of a round-ended rectangular frame so as to leave upper and lower spaces which are part-circular in cross section, in the cylindrical cam barrel, on upper and lower sides of the round-ended rectangular frame. In these part-circular spaces the guide members are disposed. By this construction of the lens shifting mechanism, a lens, in particular a zoom lens, can be made compact.

BRIEF DESCRIPTION OF THE DRAWINGS

These and other objects and features of the present invention will become apparent from the following description taken in conjunction with a preferred embodiment thereof shown in the accompanying drawings, in which:

FIGS. 2A and 2B are diagrammatic cross-sectional views showing the zoom lens of FIG. 1 in a standard condition and in a telephoto condition, respectively.

DETAILED DESCRIPTION OF THE INVENTION

Figure 1:
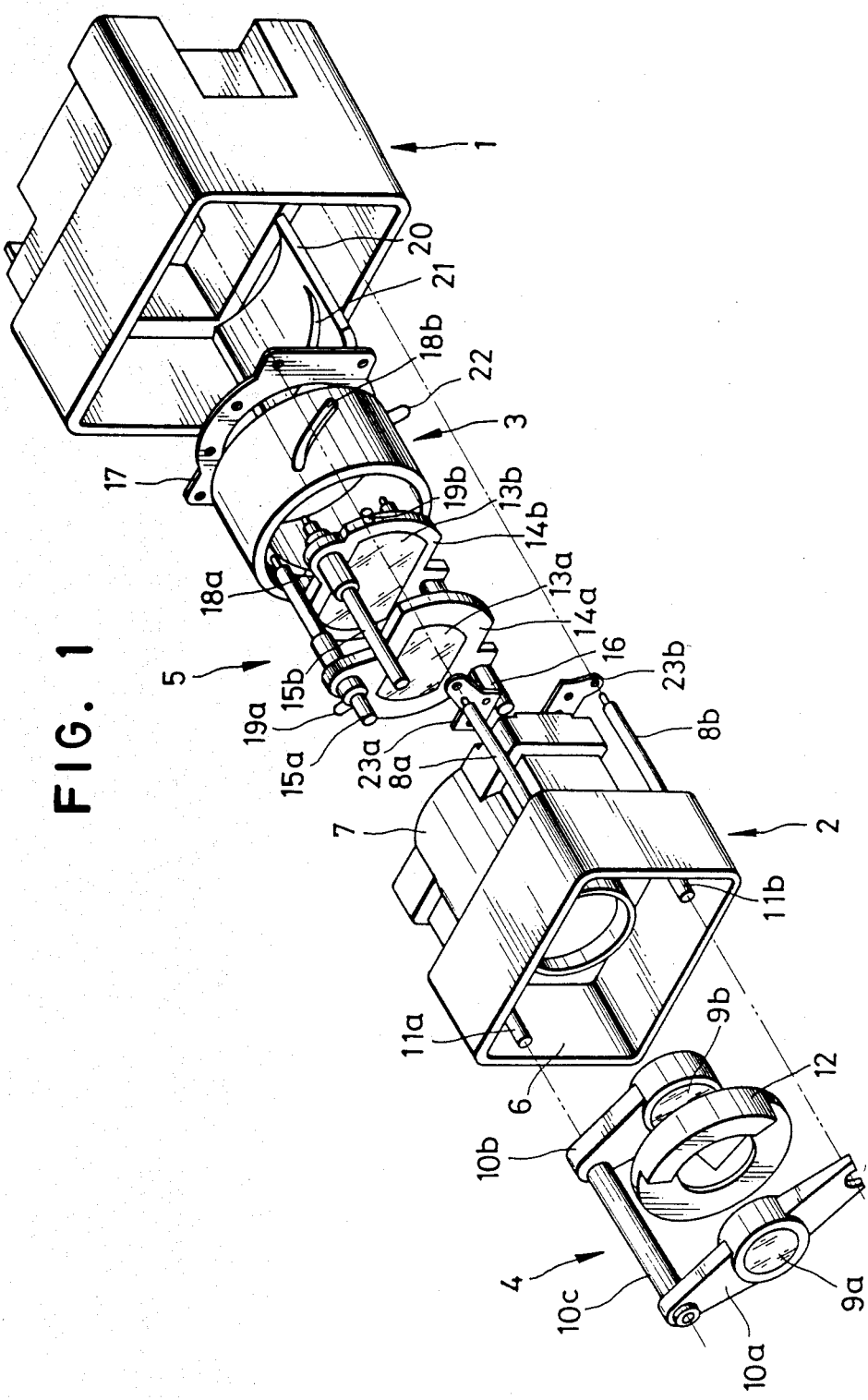
FIG. 1 is a perspective exploded view showing a zoom lens embodying the present invention.

Referring now to FIG. 1, there is shown a small-sized zoom lens for use with a compact camera which has an outer lens barrel 1 fixed to the camera body (not shown). A movable inner lens barrel 2 is supported in the outer lens barrel 1 for axial movement. For supporting the inner lens barrel 2, there is a pair of guide rods 8a and 8b fixed to the inner lens barrel 2 and passing through guide holes (not shown) formed in the outer lens barrel 1. The inner lens barrel 2 is formed with a front compartment 6 for receiving therein a front lens unit 4 and a rear compartment 7 for housing therein a rear lens unit 5 and shifting means including a cylindrical cam barrel 3 having cam slots 18a and 18b and guide members 15a, 15b and 16 in the form of rods. The front lens unit 4 includes front lens elements 9a and 9b held in lens holders 10a and 10b connected to each other by a guide sleeve 10c. The guide sleeve 10c slides on a fixed supporting rod 11a extending forwardly from the inner lens barrel 2 so as to fixedly support the front lens unit 4 in the front compartment 6 of the movable lens barrel 2. For accurately supporting the front lens unit 4, a fixed guide rod 11b extending forwardly from inner lens barrel 2 and parallel with the supporting rod 11a slidably engages a recess formed in the lens holder 10a. Provided between the front lens elements 9a and 9b is a shutter 12 well known per se.

A rear lens unit 5, which is housed in the cylindrical cam barrel 3 in the rear compartment 7 of the inner movable lens barrel 2, comprises movable rear lens elements 13a and 13b held in lens holders 14a and 14b, respectively. For supporting the movable rear lens elements 13a and 13b, there are guide rods 15a and 15b slidably supporting the lens holders 14a and 14b, respectively, for axial movement and a guide rod 16 for preventing the lens holders 14a and 14b from rotating. These rods 15a, 15b and 16 are fixed at their rear ends to a retaining plate 17 attached to the rear end of the compartment 7 of the inner lens barrel 2 and at their forward ends to the inner lens barrel 2. As is well known to those skilled in the art, in zoom lens systems used in compact cameras, it is usual to design the lens elements of the rear lens unit to have aperture sizes larger than those of the front lens unit and the rearmost lens to have the largest aperture size. This is also true in the zoom lens system of the present invention.

As is clearly shown in FIG. 1, when 35 mm-size films having a frame size of 24×36 mm are used in the compact cameras, the rear lens elements 13a and 13b of the rear lens unit 5 are formed in the shape of a round-ended rectangle defined by right and left arcuate sides and upper and lower straight parallel sides. The reason for shaping the rear lens elements in such a rectangular configuration is to make it possible to make the cylindrical cam barrel 3 incorporating therein the rear lens unit 5 including the guide rods 15a, 15b and 16, as small in diameter as possible. By contrast, if the rear lens elements 13a and 13b had conventional circular configurations, the cylindrical cam barrel 3 would be larger in diameter, resulting in a bulky zoom lens and thus increasing the overall size of the camera.

Correspondingly, the respective lens holders 14a and 14b are given a round-ended rectangular configuration.

Due to the provision of such round-ended rectangular lens elements 13a and 13b and their associated lens holders 14a and 14b, the cylindrical cam barrel 3 can be provided therein with upper and lower part-circular spaces wherein guide rods 15a, 15b and 16 with their associated parts can be easily received without needing to increase the inner diameter of the cylindrical cam barrel 3.

The cam slots 18a and 18b of the cylindrical cam barrel 3 are slidably engaged by connecting pins 19a and 19b fixed to the rear lens holders 14a and 14b, respectively. Through this cam slot 18a, 18b-pin 19a, 19b engagement, the lens holders 14a and 14b are caused to move axially along the guide rods 15a, 15b and 16, independently from each other but according to the respective cam slots 18a and 18b when the cylindrical cam barrel 3 is turned, thereby to shift the rear lens elements 13a and 13b independently from each other.

As was previously described, the cylindrical cam barrel 3 with rear lens unit 5 received therein is rotatably received in the rear compartment 7 of the movable lens barrel 2. For preventing the cylindrical cam barrel 3 from slipping out of the inner lens barrel 2, the retaining plate 17 is attached to the rear end of the rear compartment 7 of the movable lens barrel 2. The cylindrical cam barrel 3 is provided at its bottom with a pin 22 which engages with a cam slot 21 formed in a cam member 20 fixed to the bottom of the fixed outer lens barrel 1. For accommodating this cam slot 21-pin 22 engagement, there is formed at the bottom of the movable lens barrel 2 sufficient room to allow the pin 22 to extend and enter into the cam slot 21 when the movable lens barrel 2 with the cylindrical cam barrel 3 received therein is fitted into the fixed outer lens barrel 1 and these parts are assembled together. Due to this cam slot-pin engagement, when the movable lens barrel 2 is axially moved, the cylindrical cam barrel 3 is caused to turn.

Acording to the lens shift mechanism described above, because the rear lens group is movably held in the cylindrical cam barrel 3 which is received in the movable lens barrel, the necessary axial movement of the rear lens group is produced by the axial movement of the movable lens barrel 2 and the rotation of the cylindrical cam barrel 3. As a result, the cylindrical cam barrel 3 can be made shorter in comparison with conventional lens barrels by which a rear lens group is moved the necessary distance.

Reference is now had to FIGS. 2A and 2B showing the zoom lens in a standard lens condition and a telephoto lens condition, respectively. The movable lens barrel 2 is axially moved to shift the zoom lens to a desired lens condition. When the zoom lens is to be shifted into the telephoto lens condition, the movable lens barrel 2 is axially moved to its forwardmost position shown in FIG. 2B from its rearmost position shown in FIG. 1A, to move the front lens elements 9a and 9b (in these figures, these lens elements are depicted as a single lens element for simplicity) by a distance L1. For completing the shift of the zoom lens into the telephoto lens condition, the rear lens unit including rear lens elements 13a and 13b is required to be moved from the rearmost position by a distance L2 which is generally larger than the distance L1. If the movable lens barrel 2 is moved axially forwardly by the distance L1, the cylindrical cam barrel 3 follows the movement of the movable lens barrel 2 and simultaneously turns through a certain angle corresponding to the movement of the movable lens barrel 2 by the distance L1 so as to move the rear lens elements 13a and 13b still farther forward under the control of the cam slots 18a and 18b, respectively, by a distance L which is equal to the difference between the distances L1 and L2. This extra movement of the rear lens elements 13a and 13b is caused by the cam slot 21-pin 22 engagement. As a result, the rear lens elements 13a and 13b are moved overall by the predetermined distance L2, thereby shifting the zoom lens into the telephoto lens condition.

On the other hand, when the zoom lens is to be shifted into the standard lens condition, the movable lens barrel 2 is moved from the forwardmost position shown in Fig. 2B to the rearmost position shown in FIG. 2A. As a result, the rear lens elements 13a and 13 are moved rearwardly by the distance L2 although the front lens elements 9a and 9b are moved rearwardly only by the shorter distance L1.

Although the present invention has been described by way of a preferred embodiment thereof shown in the accompanying drawings, it is to be noted that various changes and modifications will be apparent to those skilled in the art. These are considered to be within the purview and scope of the present invention as defined by the appended claims.

What is claimed is:

1. A lens shifting mechanism incorporated in a camera for shifting a lens system having front and rear lens groups, comprising:
    an outer lens barrel fixed to the body of said camera;
    an inner lens barrel supported in said outer lens barrel for axial movement relative to said outer lens barrel,
    a lens holder in said inner lens barrel holding said front lens group fixedly and said rear lens group movably relative to said inner lens barrel; and
    means disposed in said inner lens barrel for causing axial movement of said rear lens group relative to said front lens group as a result of axial movement of said inner lens barrel.

2. A lens shifting mechanism as defined in claim 1, wherein said means for causing axial movement comprises a cylindrical barrel disposed in said inner lens barrel, and means causing said cylindrical barrel to rotate as a result of said axial movement of said inner lens barrel.

3. a lens shifting mechanism as defined in claim 2, wherein said means for causing axial movement further comprises a guide member for guiding axially said lens holder holding said rear lens group when said cylindrical barrel is rotated.

4. A lens shifting mechanism as defined in claim 3, wherein said cylindrical barrel has a cam slot and said lens holder has a cam follower pin engaged in said cam slot.

5. A lens shifting mechanism as defined in claim 1, wherein said lens holder for said rear lens group is shaped as a round-ended rectangle so as to leave part-circular spaces in said cylindrical cam barrel on the sides of said round-ended rectangular shaped lens holder between the rounded ends thereof.

6. a lens shifting mechanism as defined in claim 5, and guide members for said rear lens group disposed in at least one of said part-circular spaces.

7. A lens shifting mechanism as defined in claim 6, wherein said sides between the rounded ends of said lens holder are upper and lower sides thereof.

8. In a lens shifting mechanism incorporated in a camera which comprises a rotatable cylindrical cam barrel for moving a movable lens of a lens system disposed in said barrel, upon rotation of said barrel, and guide means disposed in said rotatable cylindrical cam barrel for guiding axially aid movable lens of said lens system; the improvement comprising means for holding said movable lens, said holding means being shaped in the form of a round-ended rectangle with straight side between the rounded ends thereof, by which part-circular spaces are defined in said rotatable cylindrical cam barrel, said guide means being disposed in said part-circular spaces.

9. A lens shifting mechanism as defined in claim 8, wherein said guide means comprises guide rods disposed parallel to the optical axis of said movable lens and supporting said holding means for sliding movement on said guide rods.

10. A lens shifting mechanism as defined in claim 9, wherein said sides between the rounded ends of said lens holder are upper and lower sides thereof.

* * * * *